United States Patent
Peck et al.

(10) Patent No.: US 9,341,275 B2
(45) Date of Patent: May 17, 2016

(54) MOLDED AND PACKAGED ELASTOMERIC CHECK VALVE

(75) Inventors: Raymond Peck, Los Angeles, CA (US);
Po-Ying Li, Arcadia, CA (US);
Changlin Pang, Temple City, CA (US);
Jason Shih, Yorba Linda, CA (US)

(73) Assignee: MiniPumps, LLC, Pasadena, CA (US)

( * ) Notice: Subject to any disclaimer, the term of this patent is extended or adjusted under 35 U.S.C. 154(b) by 930 days.

(21) Appl. No.: 13/233,502

(22) Filed: Sep. 15, 2011

(65) Prior Publication Data

US 2012/0211095 A1    Aug. 23, 2012

Related U.S. Application Data

(60) Provisional application No. 61/383,102, filed on Sep. 15, 2010.

(51) Int. Cl.
*F16K 15/14*    (2006.01)

(52) U.S. Cl.
CPC .............. *F16K 15/145* (2013.01); *Y10T 29/494* (2015.01); *Y10T 137/7837* (2015.04)

(58) Field of Classification Search
CPC ..... F16K 15/144; F16K 15/145; F16K 5/147; F16K 15/14; Y10T 137/7837
USPC .................................................. 137/846, 859
See application file for complete search history.

(56) References Cited

U.S. PATENT DOCUMENTS

| | | | |
|---|---|---|---|
| 996,588 A * | 6/1911 | Kennedy | .................... 137/515.7 |
| 3,307,819 A | 3/1967 | Cocito | |
| 3,608,676 A | 9/1971 | Wieck | |
| 4,014,048 A | 3/1977 | Rappleyea | |
| 4,124,773 A | 11/1978 | Elkins | |
| 4,143,853 A * | 3/1979 | Abramson | ................. 251/149.1 |
| 4,434,810 A | 3/1984 | Atkinson | |
| 4,457,757 A | 7/1984 | Molteno | |
| 4,531,543 A | 7/1985 | Markley | |
| 4,554,918 A | 11/1985 | White | |
| 4,636,150 A * | 1/1987 | Falk et al. | ..................... 417/417 |
| 4,750,901 A | 6/1988 | Molteno | |
| 4,867,200 A | 9/1989 | Markley | |
| 4,869,282 A | 9/1989 | Sittler et al. | |
| 4,948,092 A | 8/1990 | Kasper et al. | |
| 5,071,408 A | 12/1991 | Ahmed | |

(Continued)

FOREIGN PATENT DOCUMENTS

DE    9102284 U1    10/1991
DE    102008045423 A1    3/2010

(Continued)

OTHER PUBLICATIONS

International Search Report mailed Mar. 14, 2012 for International Application No. PCT/US2011/051759 (4 pages).

(Continued)

*Primary Examiner* — Kevin Lee
*Assistant Examiner* — P. Macade Nichols
(74) *Attorney, Agent, or Firm* — Morgan, Lewis & Bockius LLP

(57) ABSTRACT

Elastomeric check valves for use, e.g., in small pump devices, may include a molded elastomeric valve body forming a pocket that extends from an opening at the valve inlet to a terminus inside the valve body, and having a slit extending from the terminus to a valve outlet.

11 Claims, 9 Drawing Sheets

(56) References Cited

U.S. PATENT DOCUMENTS

| | | | |
|---|---|---|---|
| 5,116,457 A | 5/1992 | Jerman | |
| 5,171,606 A | 12/1992 | Mayer et al. | |
| 5,199,685 A | 4/1993 | Larseneur | |
| 5,222,522 A | 6/1993 | Rontome | |
| 5,261,459 A | 11/1993 | Atkinson et al. | |
| 5,265,415 A | 11/1993 | Cox, Jr. | |
| 5,411,473 A | 5/1995 | Ahmed | |
| 5,454,796 A | 10/1995 | Krupin | |
| 5,476,445 A | 12/1995 | Baerveldt et al. | |
| 5,490,220 A | 2/1996 | Loeppert | |
| 5,727,594 A | 3/1998 | Choksi | |
| 5,785,674 A | 7/1998 | Mateen | |
| 5,839,467 A | 11/1998 | Saaski et al. | |
| 6,069,392 A | 5/2000 | Tai et al. | |
| 6,126,273 A | 10/2000 | Van Vooren et al. | |
| 6,136,212 A | 10/2000 | Mastrangelo et al. | |
| 6,146,543 A | 11/2000 | Tai et al. | |
| 6,202,766 B1 | 3/2001 | Shepherd | |
| 6,237,619 B1 | 5/2001 | Maillefer et al. | |
| 6,240,962 B1 | 6/2001 | Tai et al. | |
| 6,241,904 B1 | 6/2001 | Silverbrook | |
| 6,334,761 B1 | 1/2002 | Tai et al. | |
| 6,345,502 B1 | 2/2002 | Tai et al. | |
| 6,470,904 B1 | 10/2002 | Tai et al. | |
| 6,499,297 B2 | 12/2002 | Tai et al. | |
| 6,536,213 B2 | 3/2003 | Tai et al. | |
| 6,554,591 B1 | 4/2003 | Dai et al. | |
| 6,612,535 B1 | 9/2003 | Tai et al. | |
| 6,699,394 B2 | 3/2004 | Tai et al. | |
| 6,709,604 B2 | 3/2004 | Tai et al. | |
| 6,712,591 B2 | 3/2004 | Lee | |
| 7,025,740 B2 | 4/2006 | Ahmed | |
| 7,600,533 B2 | 10/2009 | Tai et al. | |
| 8,141,573 B2 | 3/2012 | Tai et al. | |
| 8,276,616 B2 | 10/2012 | Wright et al. | |
| 2001/0014438 A1 | 8/2001 | Tai et al. | |
| 2001/0019034 A1 | 9/2001 | Tai et al. | |
| 2002/0062645 A1 | 5/2002 | Tai et al. | |
| 2003/0116738 A1 | 6/2003 | O'Connor et al. | |
| 2004/0033146 A1 | 2/2004 | Dai et al. | |
| 2006/0247664 A1 | 11/2006 | Meng et al. | |
| 2008/0035875 A1 | 2/2008 | Tai et al. | |
| 2010/0025613 A1 | 2/2010 | Tai et al. | |
| 2011/0127232 A1* | 6/2011 | Willows et al. | 215/354 |
| 2012/0241017 A1 | 9/2012 | Lin et al. | |
| 2014/0196798 A1 | 7/2014 | Tai et al. | |

FOREIGN PATENT DOCUMENTS

| | | |
|---|---|---|
| EP | 0903179 A1 | 3/1999 |
| EP | 2616727 A2 | 7/2013 |
| EP | 2049283 B1 | 2/2015 |
| JP | 2006-214837 A | 8/2006 |
| JP | 4977758 B2 | 7/2012 |
| WO | 95/31082 A1 | 11/1995 |
| WO | 98/54497 A1 | 12/1998 |
| WO | 2004/011143 A2 | 2/2004 |
| WO | WO-2012/037348 A2 | 3/2012 |
| WO | 2014/110507 A2 | 7/2014 |
| WO | 2014/110507 A3 | 2/2015 |

OTHER PUBLICATIONS

Written Opinion mailed Mar. 14, 2012 for International Application No. PCT/US2011/051759 (5 pages).

International Search Report and Written Opinion mailed Mar. 14, 2012 for International Application No. PCT/US2011/051759 (11 pages).

PCT International Patent Application No. PCT/US2011/051759, International Preliminary Report on Patentability mailed Mar. 28, 2013, 7 pages.

PCT International Patent Application No. PCT/US2014/011301, International Search Report and Written Opinion mailed Jan. 5, 2015, 17 pages.

Extended European Search Report received for Patent Application No. 07800089.0 mailed Jan. 23, 2013, 6 pages.

English Translation of Office Action mailed Aug. 2, 2011 for Japanese Patent Application No. 2009-524019, 3 pages.

International Application Serial No. PCT/US2007/075746, International Preliminary Report on Patentability mailed Jan. 7, 2009, 33 pages.

International Application Serial No. PCT/US2007/075746, International Search Report and Written Opinion mailed Sep. 12, 2008, 6 pages.

International Application Serial No. PCT/US2014/011301, Invitation to Pay Additional Fees mailed Jun. 2, 2014, 6 pages.

Berg et al., "Micro Total Analysis Systems: Microfluidic Aspects, Integration Concept and Applications", Topics in Current Chemistry, vol. 194, 1998, pp. 21-49.

Chen et al., "Floating-Disk Parylene Micro Check Valve", IEEE 20th International Conference on Micro Electro Mechanical Systems, Jan. 21-25, 2007, pp. 453-456.

Chen et al., "Surface-Micromachined in-Channel Parylene Dual Valves for Unpowered Microflow Regulation", Tech. Digest, HiltonHead 2006 Workshop, 2006, pp. 205-209.

Chen et al., "Surface-Micromachined Parylene Dual Valves for On-Chip Unpowered Microflow Regulation", Journal of Microelectromechanical Systems, vol. 16, No. 2, Apr. 2007, pp. 223-231.

Dabral et al., "Stress in Thermally Annealed Parylene Films", Journal of Electronic Materials, vol. 21, No. 10, Oct. 1992, pp. 989-994.

Euro Standard Press 2000, "Surface Mount Microphone Based on MEMS Technology", available at <http://www.esp2000.ro/articol.php?id_ar=2222>, No. 3, Nov. 2003.

Gervais et al., "Flow-Induced Deformation of Shallow Microfluidic Channels", Lab on a Chip, vol. 6, No. 4, 2006, pp. 500-507.

Knowles Electronics LLC, "SiSonic", available online at <http://www.knowlesacoustics.com/html/sil_mic.html#modelchart>.

Lecompte et al., "Photoresist Characterization and Linearization Procedure for the Gray-Scale Fabrication of Diffractive Optical Elements", Applied Optics, vol. 40, No. 32, 2001, pp. 5921-5927.

Loeppert et al., "SiSonicTM—The First Commercialized Mems Microphone", Proc. HiltonHead 2006 Workshop, Jun. 2006, pp. 27-30.

Meng et al., "Implantable Parylene MEMS for Glaucoma Therapy", Microtechnology in Medicine and Biology, 3rd IEEE/EMBS Special Topic Conference, May 12-15, 2005, pp. 116-119.

Oh et al., "A Review of Microvalves", Journal of Micromechanics and Microengineering, vol. 16, No. 5, 2006, pp. R13-R39.

Oppliger et al., "One-step 3D Shaping Using a Gray-Tone Mask for Optical and Microelectronic Applications", Microelectronic Engineering, vol. 23, No. 1-4, Jan. 1994, pp. 449-454.

Shih et al., "Surface Micromachined and Integrated Capacitive Sensors for Microfluidic Applications", Transducers, Solid-State Sensors, Actuators and Microsystems, 12th International Conference, vol. 1, Boston, MA, USA, Jun. 8-12, 2003, pp. 388-391.

Shoji et al., "Microflow Devices and Systems", Journal of Micromechanics and Microengineering, vol. 4, No. 4, Dec. 1994, pp. 157-171.

Shoji, Shuichi, "Fluids for Sensor Systems", Topics in Current Chemistry, vol. 194, 1998, pp. 163-188.

Wagner et al., "Microfabrication of Complex Surface Topographies Using Grey-Tone Lithography", Sensors and Actuators A: Physical, vol. 46, No. 1-3, Jan.-Feb. 1995, pp. 89-94.

Waits et al., "Investigation of Gray-Scale Technology for Large Area 3D Silicon MEMS Structures", Journal of Micromechanics and Microengineering, vol. 13, No. 2, 2003, pp. 170-177.

Wang et al., "A Normally Closed in-Channel Micro Check Valve", The Thirteenth Annual International Conference on Micro Electro Mechanical Systems, MEMS 2000, Jan. 23-27, 2000, pp. 68-73.

Wang et al., "A Parylene Micro Check Valve", Micro Electro Mechanical Systems, MEMS '99, Twelfth IEEE International Conference, Jan. 21-21, 1999, pp. 177-182.

Xie et al., "Surface Micromachined Leakage Proof Parylene Check Valve", Micro Electro Mechanical Systems, MEMS 2001, The 14th IEEE International Conference; Interlaken, Switzerland, Jan. 25-25, 2001, pp. 539-542.

* cited by examiner

MOLDED AND PACKAGED ELASTOMERIC CHECK VALVE

CROSS-REFERENCE TO RELATED APPLICATION

This application claims priority to and the benefit of U.S. Provisional Application No. 61/383,102, filed on Sep. 15, 2010, the entire contents of which are hereby incorporated herein by reference.

TECHNICAL FIELD

This invention relates generally to small, reliable check valves and methods of manufacturing same.

BACKGROUND

The need for ever-smaller pumping devices, particularly in the medical field, continues to grow. As a result, the need for increasingly small operational pump components, such as check valves, is growing as well, challenging the limits of conventional manufacturing processes. Valves less than 1 or 2 mm in size are difficult to fabricate using conventional molding technology, and while some fabrication of microscale valves using microelectromechanical systems (MEMS) technology is being performed, such techniques can be expensive. Small, commercially available silicone valves produced using conventional techniques tend to be unreliable (exhibiting leakage and large production variations) at the sub-millimeter scale. A clear need exists for a small, reliable and durable valve that is simple to fabricate and suitable for use in microscale pumps having submillimeter component dimensions.

SUMMARY

In various embodiments, the present invention provides elastomeric check valve structures that can be manufactured reliably and cost-effectively at small (e.g., submillimeter) scales. A check valve is a one-way valve that allows free flow when a positive differential pressure is applied across the valve (i.e., the pressure at the inlet is greater than the pressure at the outlet), but inhibits (or "checks") backflow when a negative differential pressure is applied. As described herein, the check valve may be molded from an elastomeric polymer, and may have a configuration similar to a duckbill valve, with an outlet slit that closes in the absence of a positive pressure differential.

In one aspect, the invention is directed to a check valve including an elongated, elastomeric body shaped to fit within a tube and having two axially opposed ends. In various embodiments, a pocket extends into the body from an opening in the first end and has a tapered (and, optionally, rounded) terminus within the body. A slit extends from the second end of the body to the pocket terminus to fluidically couple the second end to the pocket. The slit can be opened only by positive fluid pressure within the pocket. The slit may be sized so as to provide a specified stiction area, and may be tapered from a wide end at the second body end to a narrow end at the pocket terminus.

The valve body may be formed of a material including or consisting essentially of medical-grade silicone, silicone rubber, or a polyurethane-based elastomeric composite, or any material with suitable durometer (e.g., a durometer in the range from about Shore A 5 to about Shore A 100, preferably in the range from about Shore A 20 to about Shore A 40). In some embodiments, the length of the body does not exceed 1 mm and/or the diameter of the body does not exceed 0.5 mm.

In another aspect, the invention relates to a check valve assembly including a valve as described above, a first tube tightly surrounding a portion of the body and extending past the first end from an intermediate point between the first and second ends of the body distal to the pocket terminus, and a second tube tightly surrounding at least a portion of the first tube and extending past the second end of the body. The diameter of the second tube exceeds the diameter of the body so as not to interfere with opening of the slit. In some embodiments, the elastomeric body is made of (or includes) silicone, and the tubes are made of (or include) parylene.

In yet another aspect, the invention pertains to a method of manufacturing a check valve (such as the check valve described above). In various embodiments, the method includes molding an elongated valve body having first and second axially opposed ends and defining therein a pocket extending from an opening in the first end to a tapered terminus within the body. Further, the method involves forming a slit in the body extending from the second end to the pocket terminus to fluidically couple the second end to the pocket portion. The slit is openable only by positive fluid pressure within the pocket portion. The slit may be cut with, for example, a micrometer-scale blade, a silicon blade, a water jet, a laser, a needle, or a fine probe.

In some embodiments, the valve body is molded by filling a glass capillary with an uncured elastomeric polymer in liquid form, introducing an air bubble into the uncured polymer, curing the polymer so as to retain the air pocket following cure, removing the cured polymer from the capillary, and cutting a length of the removed polymer such that the cut length contains a portion of the air pocket that includes the terminus. In alternative embodiments, the molding step involves providing two mold forms, the first form including a cavity that defines an exterior surface of the valve body, and the second form including an extruded structure that defines the pocket and can be inserted into the cavity. Using the two mold forms, the valve body may be molded by filling the space within the cavity surrounding the extrusion with elastomeric polymer in liquid form, curing the polymer, and removing the cured polymer from the mold forms. The mold form may be manufacture using microphotolithography, precision machining, deposition, or a combination of these techniques.

A further aspect relates to a method of manufacturing a check valve assembly. In various embodiments, the method includes the steps of bonding a first tube to a fixture; placing a valve body as described above into the first tube; forming a slit extending from the second end to the pocket terminus to fluidically couple the second end to the pocket portion; bonding a second tube to the first tube; and removing an assembly comprising the valve body, the second tube, and a portion of the first tube from the fixture. The bonding steps may include applying epoxy between respective bonded surfaces. A stainless-steel needle may be used as the fixture; in some embodiments, the needle is crimped at the tip and the first tube bonded to the crimped portion.

These and other advantages and features of the invention will become more apparent through reference to the following description, the accompanying drawings, and the claims. Furthermore, it is to be understood that the features of the various embodiments described herein are not mutually exclusive and can exist in various combinations and permutations. As used herein, the terms "substantially" and "about" generally mean ±10%, and, in some embodiments, ±5%. The term "consists essentially of" means excluding other materials that contribute to function, unless otherwise defined herein. Nonetheless, such other materials may be present, collectively or individually, in trace amounts.

DETAILED DESCRIPTION

Figure 1:
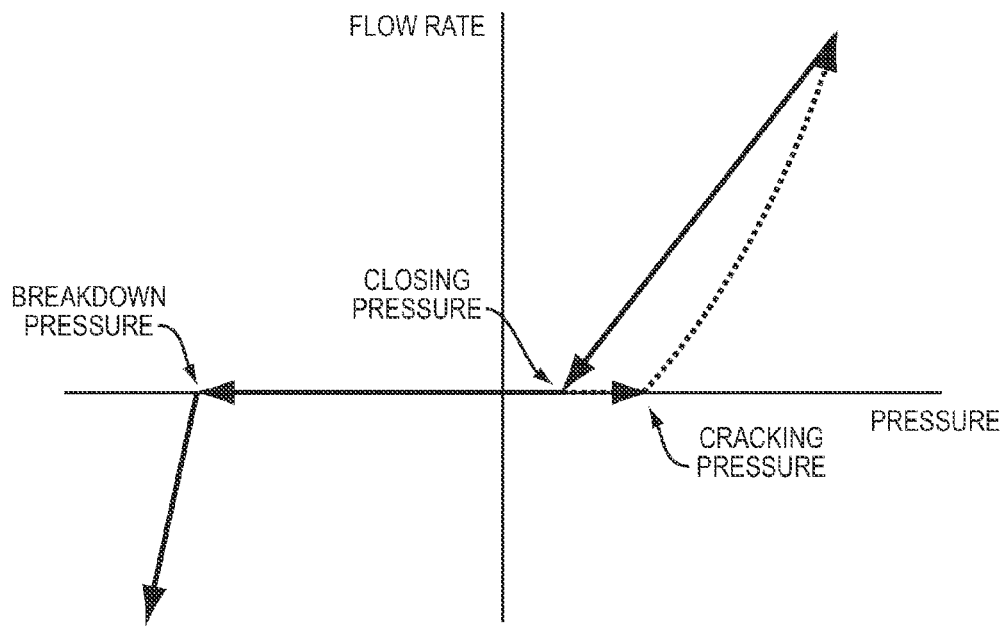
FIG. 1 graphically illustrates the flow/pressure curve of a typical one-way valve.

FIG. 1 shows a typical flow/pressure curve of a normally-closed one-way valve (i.e., the flow rate through the valve plotted as a function of differential pressure across the valve), which conceptually illustrates the performance characteristic of the valve. When pressure increases in the positive pressure direction, as indicated by the dashed line, the valve does not open (and the flow rate, thus, remains zero) until the "cracking pressure" is reached. After passing the cracking pressure, the flow rate increases with pressure. When the pressure subsequently decreases, as indicated by the solid line, the flow rate drops to zero at a pressure less than or equal to the cracking pressure, which is referred to as the "closing pressure." As the pressure becomes negative, no flow can be observed until the "breakdown pressure" is reached, at which point the integrity of the valve structure is damaged and the fluid flows in the backward direction.

Figure 2:
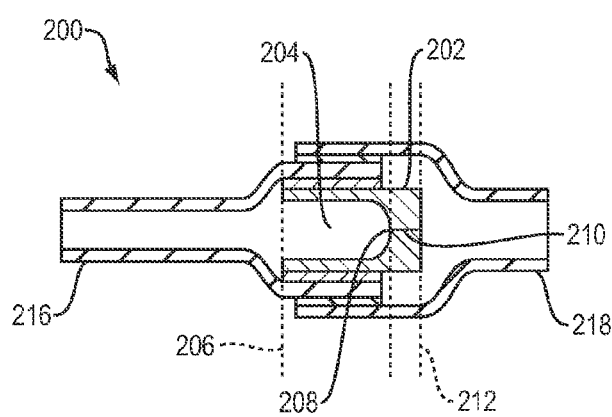
FIG. 2 is a schematic sectional drawing of an elastomeric check valve structure in accordance with one embodiment.

FIG. 2 illustrates a check valve 200 in accordance with various embodiments, which can, generally, achieve the flow-pressure characteristic described above. The valve 200 includes an elongated valve body 202 forming a pocket 204 therein. The pocket 204 extends from an opening 205 at the inlet end 206 of the valve body 202 to a terminus 208 within the body 202. A slit 210 connects the pocket terminus 208 to the outlet end 212 of the body 202. Positive fluid pressure in the pocket 204 causes the slit 210 to open. The pocket 204 is desirably tapered towards the terminus 208 so as to direct fluid that enters the pocket 204 through the opening 205 towards the slit 210. For example, the pocket may have a "bullet-like" shape, as shown in FIG. 2, or a frustoconical shape.

The valve body 202 may be made of an elastomeric polymer (or "elastomer") of suitable durometer values (e.g., a durometer value in the range from about Shore A 5 to about Shore A 100, in some embodiments in the range from about Shore A 20 to about Shore A 40). The durometer is a standard measure of the hardness of a rubber-like material, and may be determined, for example, by measuring the depth of an indentation created in the material surface by a standard force. The durometer value influences both the elasticity and the surface energy (due to stiction) of the elastomer material. Within typical durometer ranges of rubber materials, a higher-durometer elastomer is usually softer (i.e., has lower elasticity) and "stickier" (i.e., has higher stiction). In valve structures, both higher elasticity and higher stiction tend to result in higher cracking pressures. Suitable elastomers for use in valves described herein include, for example, medical-grade silicone, silicone rubber, and polyurethane, but other natural or synthetic rubbers (like buna (polybutadiene) or viton (fluorinated hydrocarbon)) may also be used The valve body 202 may be housed within a tube for protection. To minimize the outside diameter of the overall structure, the housing tube preferably has a thin wall. The tube may be made from a material that resists expansion, thereby containing the valve's internal pressure; suitable materials include, e.g., hard plastics (such as, but not limited to, parylene, polystyrene, polyacrylate, or polyetheretherketone), metals, glass, or composite materials. The valve housing desirably conforms tightly to the maximum dimension of the valve body 202 at the inlet 206, but provides a circumferential clearance around the front section of the valve that includes the outlet 212. As illustrated, this may be accomplished with two nested tubes 216, 218. A portion of the valve body 202 that includes the inlet end 206 may be mounted or received within the inner, upstream tube 216, which is itself received within the outer, downstream tube 218 as illustrated. The two tubes 216, 218 may be secured to one another where they overlap with an adhesive such as, e.g., epoxy. In alternative embodiments, the valve body may be placed into a single tube of varying diameter, or it may include a recessed portion at the outlet end and be placed into a single tube of constant diameter.

Figure 3A:
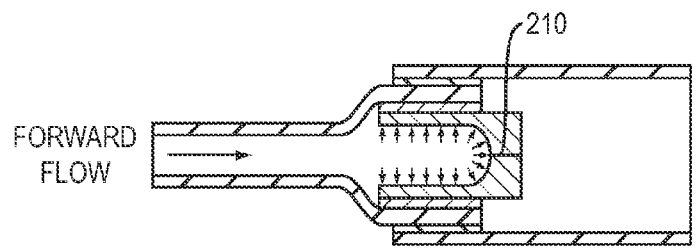
FIGS. 3A-3D are schematic sectional drawings illustrating the function of elastomeric check valves in accordance with various embodiments.
Figure 3B:
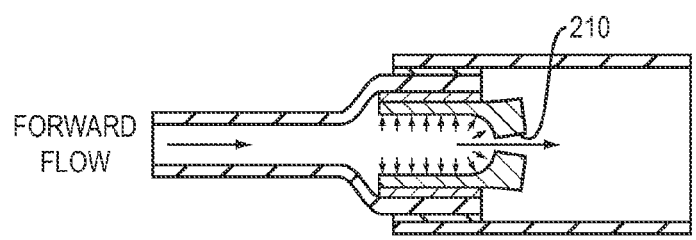
Figure 3C:
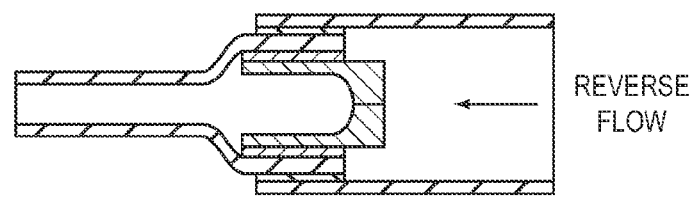
Figure 3D:
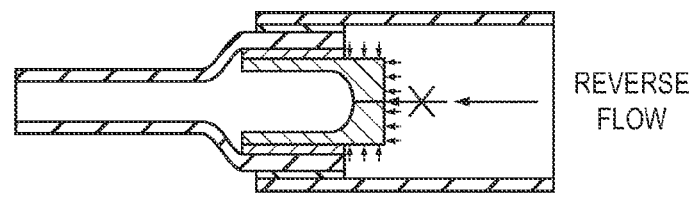

FIGS. 3A-3D illustrate the operation of the valve 200. The slit 210 is normally closed (FIG. 3A). When fluidic pressure exceeding the cracking pressure is applied in the forward direction, the valve slit 210 is forced open, and fluid flows through the valve (FIG. 3B). When the pressure is relieved, the valve slit 210 closes (FIG. 3C); in general, the closing pressure of the valve is greater than zero. As pressure is applied in the backward direction, the slit 210 remains closed, up to a breakdown pressure, due to stiction (i.e., static-friction) forces at the slit interface, thereby preventing backflow (FIG. 3D).

Figure 4A:
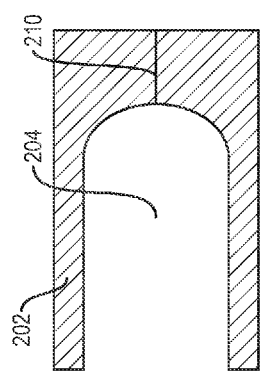
FIGS. 4A and 4B are schematic sectional drawings illustrating different shapes of the valve body in accordance with two embodiments.
Figure 4B:
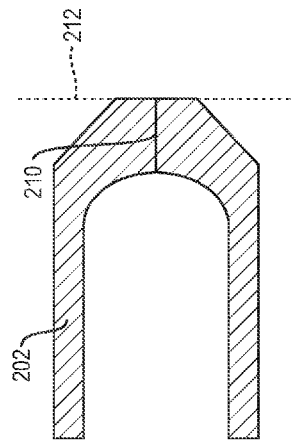

The pressure exerted on the walls of the valve body closest to the valve outlet 212 creates peeling forces at the slit 210, which may affect valve opening both under forward pressure and under backpressure. By using a valve body 202 whose side walls remain parallel near the outlet 212 (resulting, e.g., in a constant diameter for a circular valve cross section), as shown in FIG. 4A, or are sloped towards the outlet 212 (resulting in a decreasing diameter for a circular cross section), as shown in FIG. 4B, the peeling forces under backpressure may be minimized (and the breakdown pressure, thus, maximized).

Figure 5A:
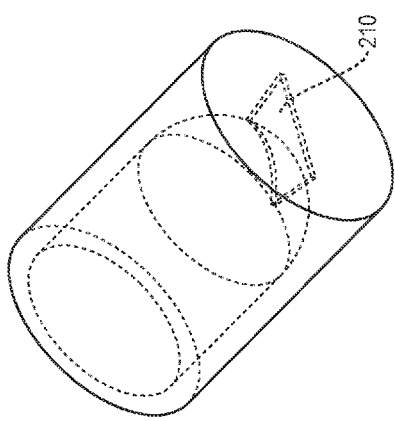
FIGS. 5A and 5B are perspective drawings of a valve body in accordance with two embodiments, illustrating valve slits with small and large surface area, respectively.
Figure 5B:
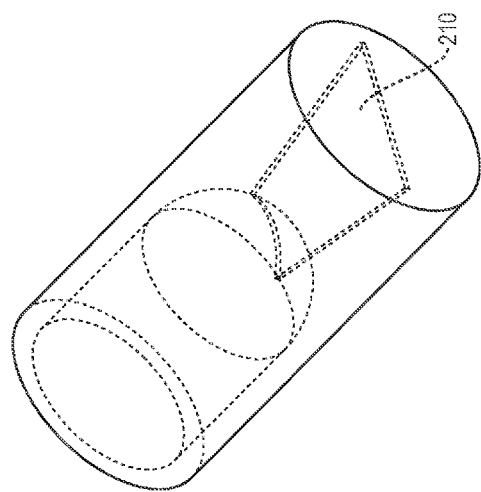

The closure behavior of the valve (as characterized, among other things, by the cracking and closing pressures) generally depends on the elasticity and geometry of the valve body 202 as well as on the surface energy of the slit 210. The surface energy, in turn, is a function of the area of the stiction surface (i.e., the area of the slit) and the coefficient of static friction of the valve body material. Thus, for a given valve material, the cracking pressure of the valve may be set by adjusting the stiction area. The larger the stiction area, the higher the surface energy and, thus, the cracking pressure. As shown in FIGS. 5A and 5B, the stiction area can be increased, for example, by increasing the length of the valve body 202 while keeping the length of the pocket 204 constant. The cracking pressure also depends on the durometer, which affects both the elasticity of the valve body 202 and stiction of the slit 210. Materials with lower durometer are typically more elastic, which tends to decrease the cracking pressure, but also have higher surface energy, which tends to increase the cracking pressure. To the extent important to a particular application, the relative influence of elasticity and stiction can be readily determined without undue experimentation, and if desired, a suitable material for a target application and cracking pressure can be based thereon.

An exemplary check valve in accordance herewith may include a silicone valve body housed in parylene tubing. Parylene is highly biocompatible and, thus, particularly suited for use in medical implants. To facilitate use of the valve in microscale pumps, the valve body may be fabricated to a diameter of less than 0.5 mm (e.g., 0.25 mm) and a length of less than 1 mm (e.g., 0.5 mm); in some embodiments, even valve dimensions of only tens of micrometers are possible. However, larger valves are also within the scope of the invention.

Figure 6A:
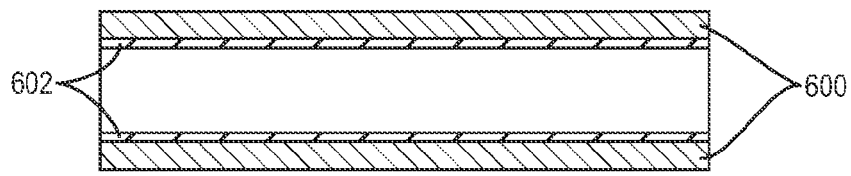
FIGS. 6A-6E are schematic sectional drawings illustrating a method of manufacturing an elastomeric valve body in a glass capillary in accordance with one embodiment.
Figure 6B:
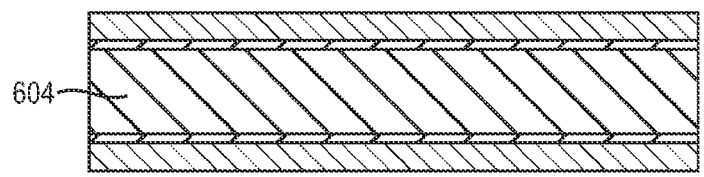
Figure 6C:
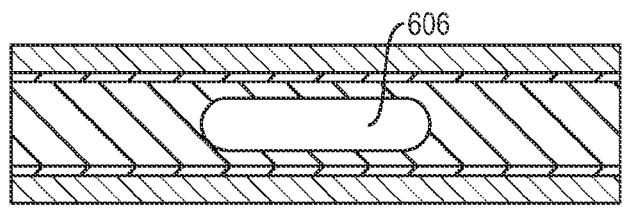
Figure 6D:
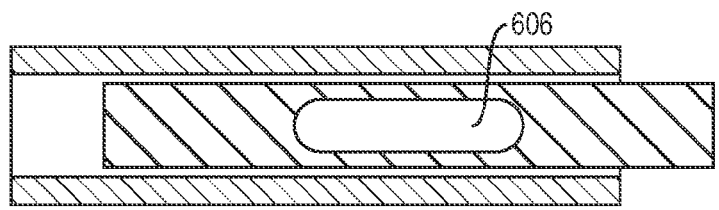
Figure 6E:
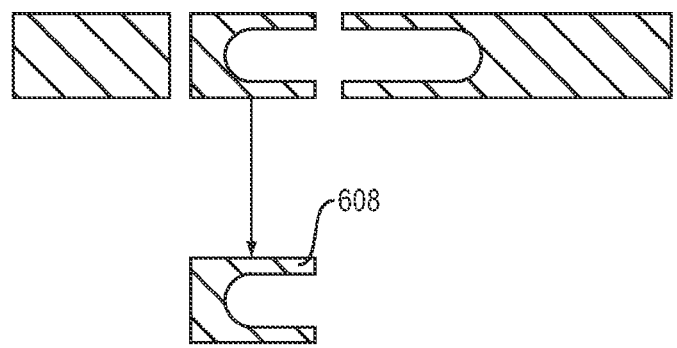

Elastomeric valve bodies as described herein can be manufactured at low cost using any of various molding techniques. One method, illustrated in FIGS. 6A-6E, utilizes a glass pipette as the mold form, into which an isolated air pocket is introduced. In a first step, shown in FIG. 6A, the interior surface of a glass micropipette 600 is coated with polyvinyl alcohol (PVA), for example, by filling the micropipette 600 with liquid PVA solution (e.g., 1 g of PVA dissolved in 20 mL de-ionized water) using a syringe, blow-drying the PVA from inside the glass pipette 600 to form a thin PVA layer 602, and baking the pipette 600 in an oven at 80° C.±5° C. for about one hour. Next, a silicone mixture 604, such as, e.g., NuSil MED4-4210 (available from NuSil Silicone Technology, Carpinteria, Calif.), is injected into the PVA-coated pipette (FIG. 6B). One or more air bubbles 606 are then deliberately introduced into the silicon-filled glass pipette 600 before the silicone 604 is cured in an oven at 80° C.±5° C. for about 1.5 hours (FIG. 6C). The PVA layer 602 may subsequently be dissolved, e.g., by soaking the micropipette 600 for about twelve hours in de-ionized water, so as to release the cured silicone 604 from the pipette 600 (FIG. 6D). Finally, the silicone block may be cut along sections near and through the enclosed air bubble 606 to obtain the valve body 608 (FIG. 6E).

Figure 7A:
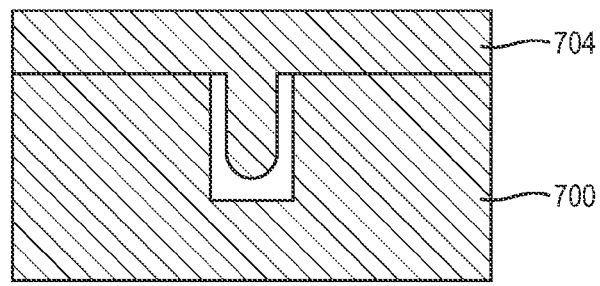
FIGS. 7A-7C are schematic sectional drawings illustrating a soft-lithography method for manufacturing an elastomeric valve body in accordance with one embodiment.
Figure 7B:
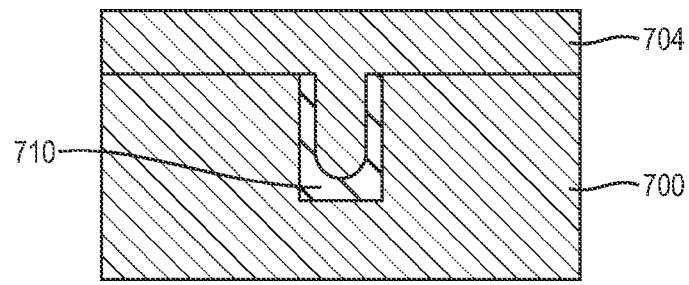
Figure 7C:
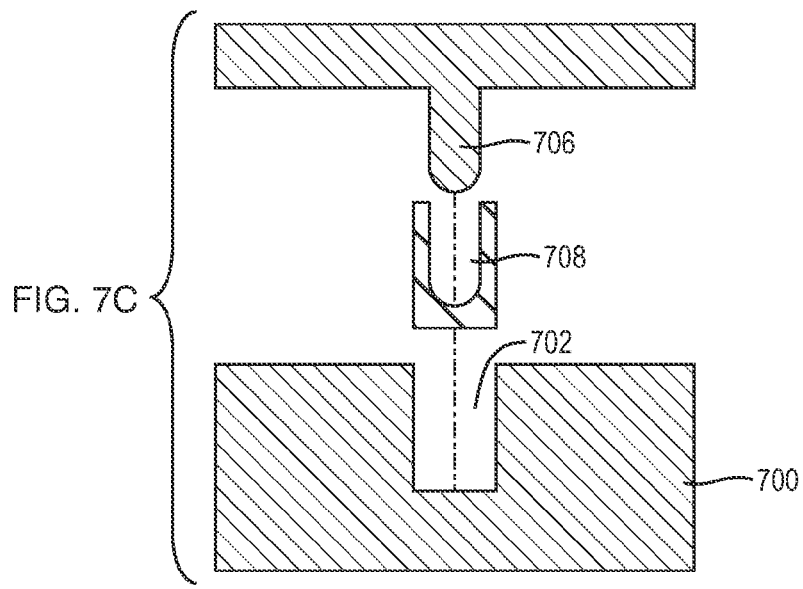

Other suitable molding techniques for the valve body include the use of microphotolithography to fabricate suitable mold forms, followed by soft lithography to mold the valve body. For example, silicon blocks may be etched using photoresist as a mask to create two complementary mold forms as illustrated in FIG. 7A: an exterior form 700 that includes a cylindrical or cuboid cavity 702 defining the outer surface of the valve body, and an insert 704 with an extruded structure 706 that defines the pocket 708. Suitable etching techniques for producing the molds 700, 702 include (but are not limited to) wet etching (using, e.g., acid, alkali, or mixing chemicals), dry etching (e.g., plasma etching, reactive ion etching (RIE), and deep reactive ion etching (DRIE)), and irradiation etching (using high-energy radiation such as UV-light, X-rays (LIGA), or gamma rays). To produce the valve body, liquid-phase elastomer 710 is injected into the two-part mold 700, 702 (FIG. 7B), cured, and then released from the mold (FIG. 7C) according to procedures well-known in the art.

Figure 8:
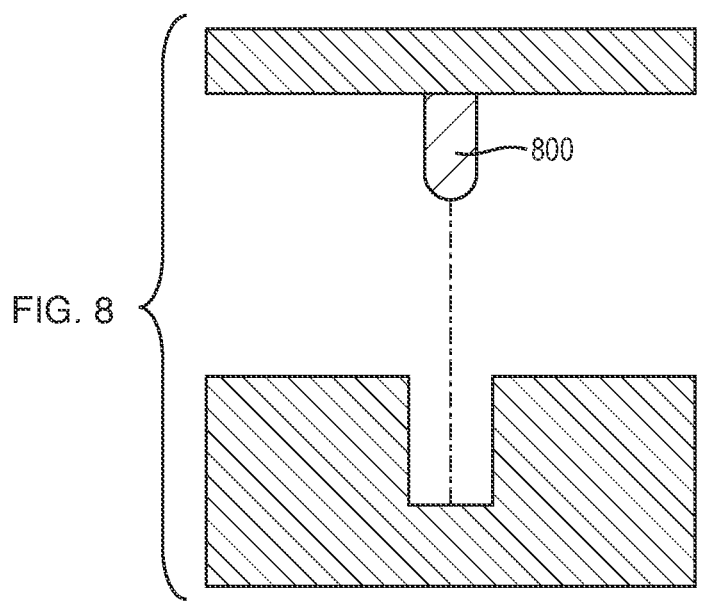
FIG. 8 is a schematic sectional drawing illustrating a deposition method of manufacturing an elastomeric valve body in accordance with one embodiment.

The use of photolithography to pattern the molds 700, 702 generally offers finer control over feature sizes and shapes than standard machining processes. However, in various embodiments, traditional or non-traditional high-precision machining techniques may be used to produce the molds for the valve body. For example, electrical discharge machining (EMD) may be utilized to create highly accurate metal molds for the valve. Yet another way to create the insert mold 702 for the elastomeric check valve body is to use a deposition technique. Examples include, but are not limited to, thick photoresist coating (using, e.g., AZ 4610, AZ 9260, or SU-8 series photoresist), oxide deposition, and metal deposition. FIG. 8 illustrates the use of a mold created by a deposition technique. The extruded structure 800 may be made by first depositing a thick layer of photoresist (or another suitable material), and then controllably removing the material (for example, using developer to remove photoresist that has been exposed to UV radiation) to leave the desired structure.

Figure 9A:
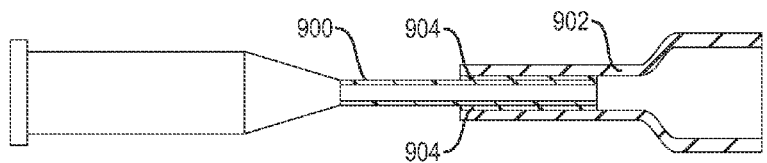
FIGS. 9A-9E are schematic sectional drawings illustrating a method of assembling an elastomeric check valve in accordance with one embodiment.
Figure 9B:
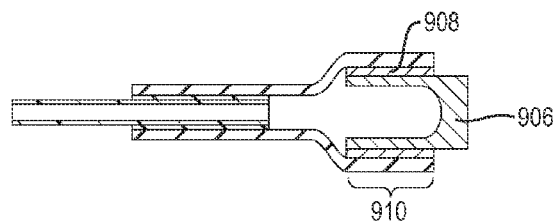
Figure 9C:
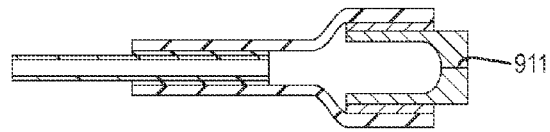

FIGS. 9A-9F illustrate a procedure for assembling the valve structure. In a first step, shown in FIG. 9A, a suitable fixture 900 for holding the device during the assembly process is provided. The fixture 900 may, for example, be a stainless steel needle 900 (e.g., a 23G needle), which, if its size and shape so require, may be crimped to create a flat, recessed tip. The flat, recessed end of an upstream parylene tube 902 is slipped onto and bonded to the fixture 900 (e.g., onto its flat, recessed tip). Bonding may be accomplished, for example, by applying epoxy (or another suitable adhesive) 904 around the edge of the parylene tube 902, allowing to run into the gap between the parylene tube 902 and the fixture 900, and curing it in an oven at about 80° C. for 180±10 minutes. Next, a previously formed valve body 906 is placed into and bonded to the parylene tube 902 (FIG. 9B). For example, silicone 908 may be mixed and applied to the internal surface of the round portion 910 of the parylene tube, and, after placement of a silicone valve body 906 into the tube, cured at 80±5° C. for 100±10 min.

A symmetrically shaped, micrometer-scale blade (e.g., an ophthalmic blade or lance) may be used to cut a slit 911 into the silicone valve body 906 at the outlet end (FIG. 9C), resulting in a clean interface. Alternative precise cutting methods include, but are not limited to, use of a silicon blade, water jet, laser, needle, or fine probe. Depending on the cutting tool used, the shape of the slip may vary. For example, a spear-type blade typically results in a slit that is tapered towards the terminus of the pocket, as illustrated in FIGS. 5A and 5B. Other tools may cause the slit to be straight or tapered towards the outlet end, or take the shape of a narrow strip or line.

Figure 9D:
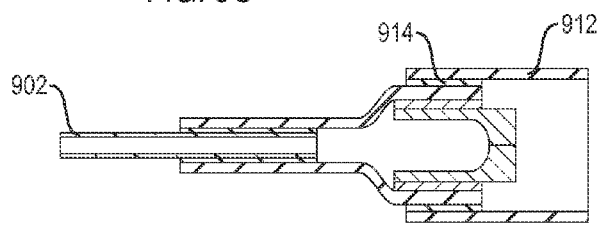
Figure 9E:
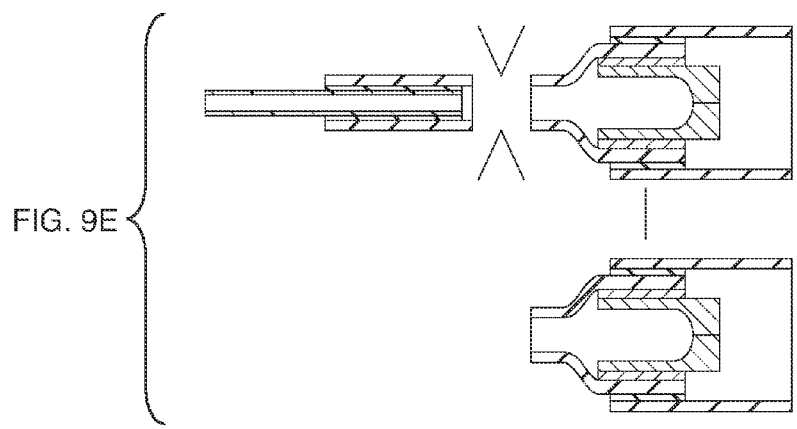

In the next step, a downstream parylene tube 912 is slipped over the round portion 910 of the upstream tube 902. Epoxy (or another suitable adhesive) 914 is applied around the interface between the upstream and downstream parylene tubes 902, 912 and allowed to run into the gap between both tubes (FIG. 9D). The epoxy may be cured in an oven programmed with the following cycle: (1) temperature ramping to 80° C.

over a period of thirty minutes; (2) soak at 80° C. for 180 minutes; and (3) temperature ramping to 20° C. over a period of one minute. Finally, the completed valve structure is cut off the fixture 900 using, e.g., a scalpel blade (FIG. 9E).

Figure 10:
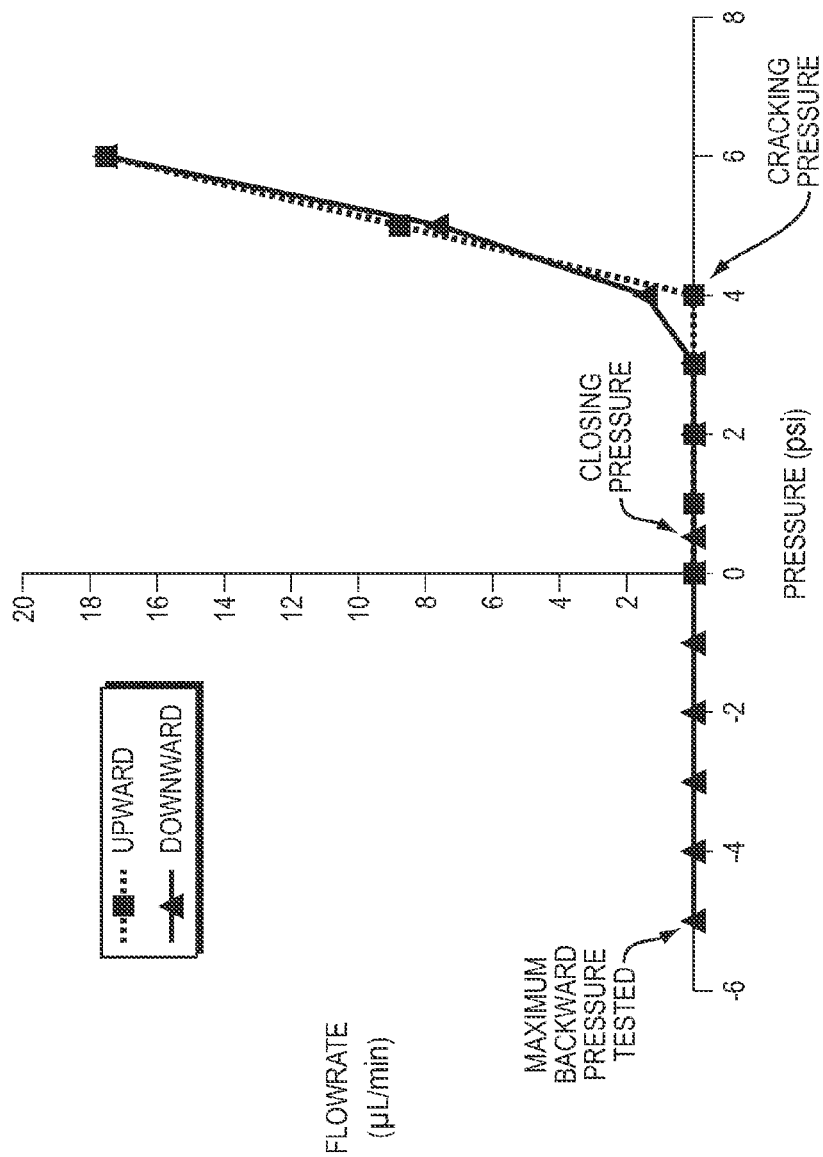
FIG. 10 graphically depicts an experimentally determined flow/pressure curve of an elastomeric check valve in accordance with on embodiment.
Figure 11A:
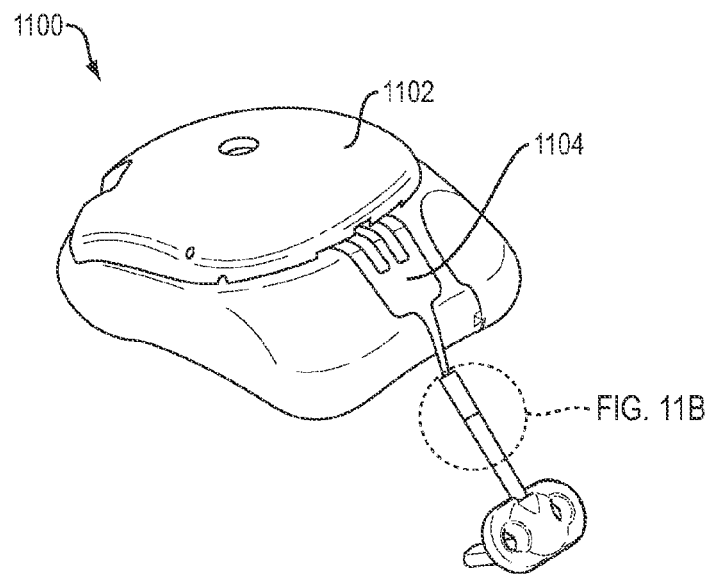
FIG. 11A is a perspective drawing illustrating a pump device including an elastomeric check valve in accordance with one embodiment.
Figure 11B:
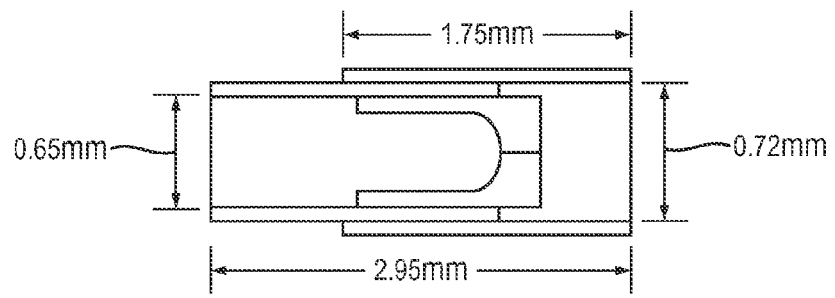
FIGS. 11B and 11C are sectional drawings illustrating the dimension of a check valve suitable for use in the pump device of FIG. 11A.
Figure 11C:
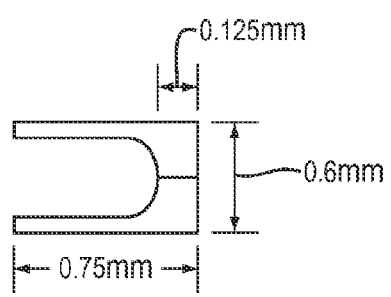

FIG. 10 shows test data obtained for an elastomeric check valve in accordance with one embodiment (having the geometry and dimensions shown in FIGS. 11B and 11C). FIG. 10 illustrates the measured flow/pressure curve, with a dashed line indicating the flow rate behavior for increasing pressure, and a solid line indicating the behavior for decreasing pressure. The graph shows a cracking pressure at about 4 psi and a closing pressure at about 3 psi. The breakdown pressure falls outside the range of tested backward pressures and, therefore, does not show up in the curve. The tested valve exhibits substantially no backward leakage (i.e., the leak rate is much lower than the design requirement) in the pressure range for which the valve is designed.

Check valves in accordance with the present invention have commercial applications for a variety of fluidic and pump devices, including, e.g., drug pumps for external use or implantation. FIG. 11A shows, for example, an ophthalmic micropump 1100 including a drug reservoir 1102 that is connected to an outlet placed, in operation, at the injection site (here, the pars plana of the eye) via a cannula 1104. To avoid undesired backflow of bodily fluids into the drug reservoir 1102, the cannula includes an elastomeric micro check valve that allows fluid flow only from the reservoir towards the outlet. The check valve is shaped and sized to fit within the cannula 1104. For example, in typical ophthalmic micropumps, which have dimensions of 10×8×5 mm, the valve structure has a diameter of about 0.75 mm; dimensions of the valve according to one embodiment are shown in FIGS. 11B and 11C.

Although the present invention is described above with reference to specific embodiments and details, the invention is not limited to those embodiments and details. Rather, various additions and modifications to what is expressly described herein, which will be readily apparent to one of skill in the art, are also included within the scope of the invention. Moreover, it is to be understood that the features of the various embodiments described herein can exist in various combinations and permutations without departing from the spirit and scope of the invention. Accordingly, details of the above description are intended for illustration only, and not to be regarded as limiting the scope of the invention, except as and to the extent that they are included in the accompanying claims.

What is claimed is:

1. A check valve assembly comprising:
   a valve comprising (i) an elongated, elastomeric body having first and second axially opposed ends, (ii) a pocket extending into the body from an opening in the first end and having a tapered terminus within the body, and (iii) a slit extending from the second end to the pocket terminus to fluidically couple the second end to the pocket, whereby the slit is openable only by positive fluid pressure within the pocket;
   a first tube tightly surrounding only a portion of the body, the first tube extending past the first end from an intermediate point between the first and second ends of the body distal to the pocket terminus; and
   a second tube tightly surrounding at least a portion of the first tube and extending past the second end of the body, the second tube (i) having a diameter exceeding a diameter of the body so as not to interfere with opening of the slit and (ii) being nowhere in contact with the valve.

2. The check valve assembly of claim 1 wherein the elastomeric body comprises silicone.

3. The check valve assembly of claim 1 wherein at least one of the first or second tubes comprises parylene.

4. The check valve assembly of claim 1 wherein the second end of the elastomeric body extends beyond the first tube to provide circumferential clearance around the slit.

5. The check valve assembly of claim 1 wherein the terminus is rounded.

6. The check valve assembly of claim 1 wherein the slit is tapered from a wide end at the second body end to a narrow end at the pocket terminus.

7. The check valve assembly of claim 1 wherein the slit is sized so as to provide a specified stiction area.

8. The check valve assembly of claim 1 wherein the body comprises at least one of medical-grade silicone, silicone rubber, or a polyurethane-based elastomeric composite.

9. The check valve assembly of claim 1 wherein the body comprises a polymer having a durometer in the range from about Shore A 5 to about Shore A 100.

10. The check valve assembly of claim 1 wherein the elastomeric body has a length not exceeding 1 mm.

11. The check valve assembly of claim 1 wherein the elastomeric body has a diameter not exceeding 0.5 mm.

* * * * *